S. A. COONEY.
DOUBLE ROPE TRAMWAY.
APPLICATION FILED OCT. 14, 1909.
998,280.
Patented July 18, 1911.
14 SHEETS—SHEET 1.
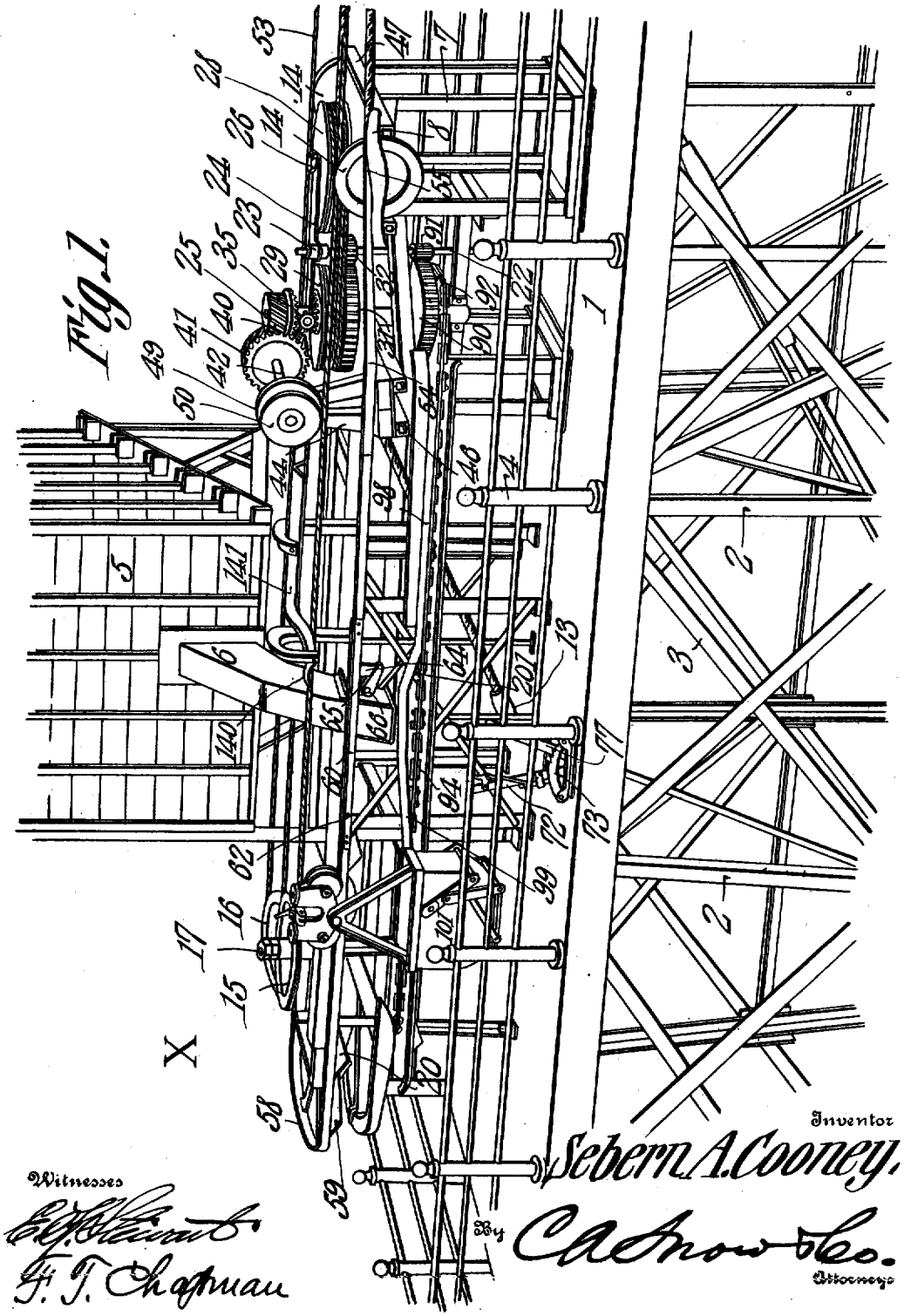

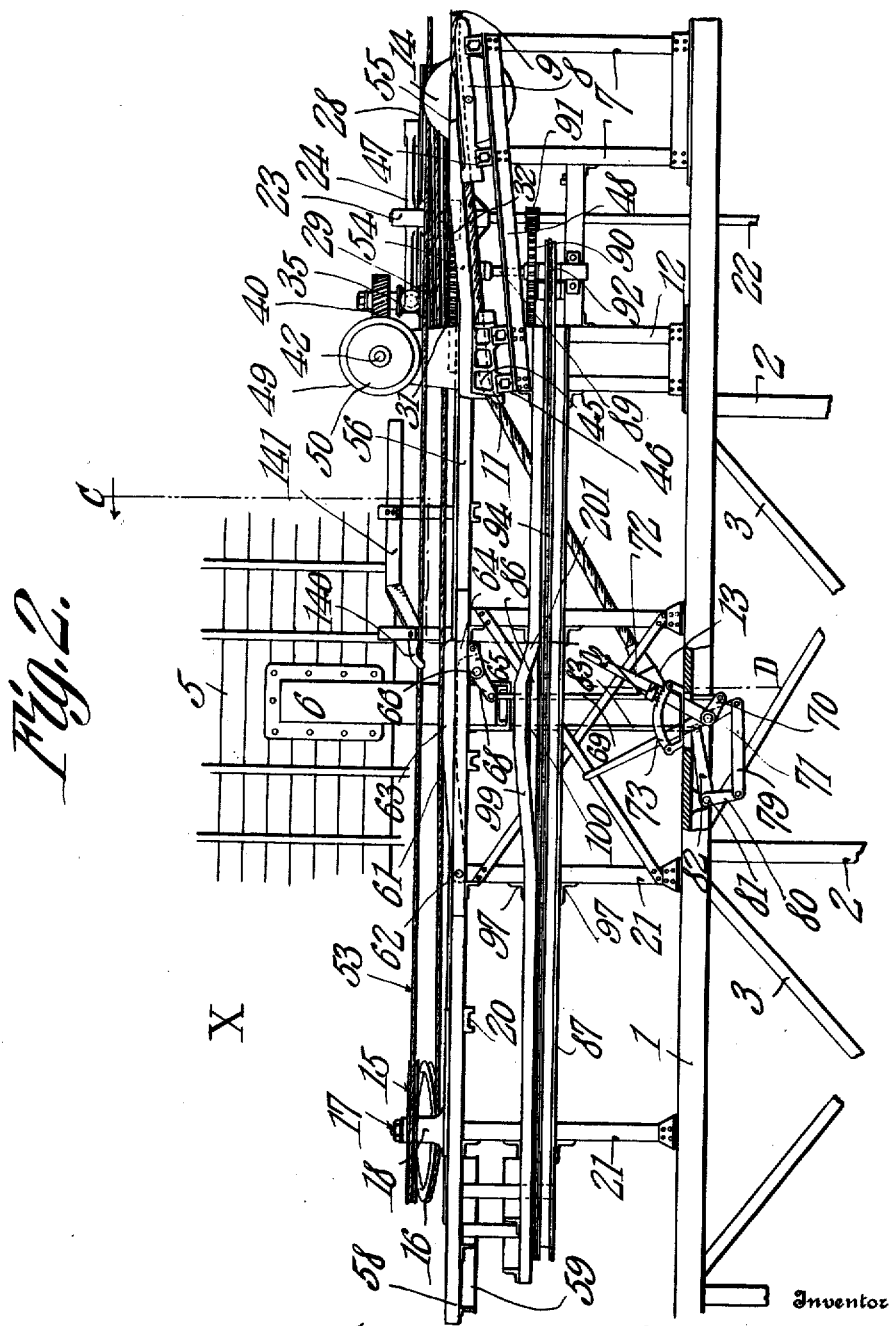

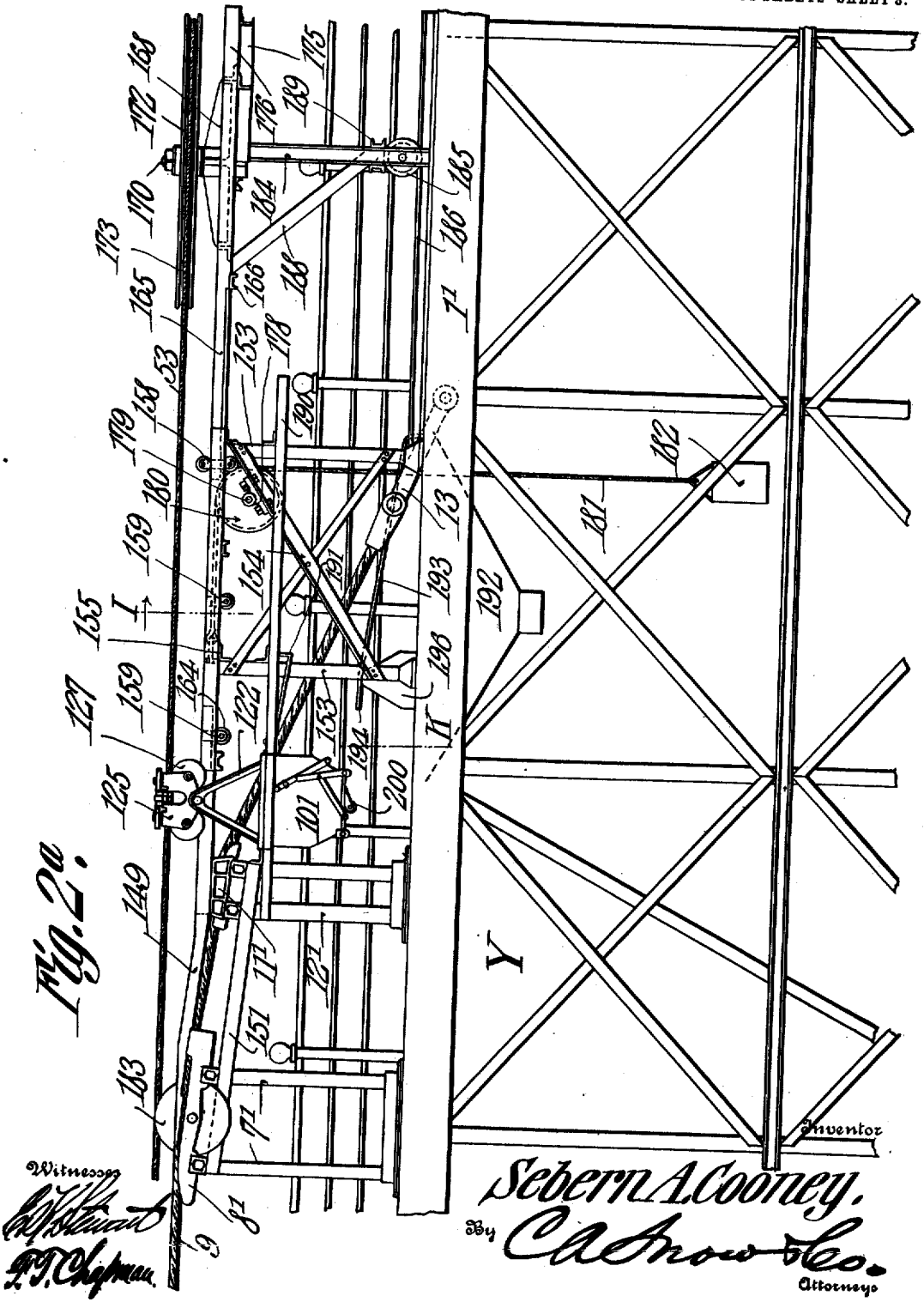

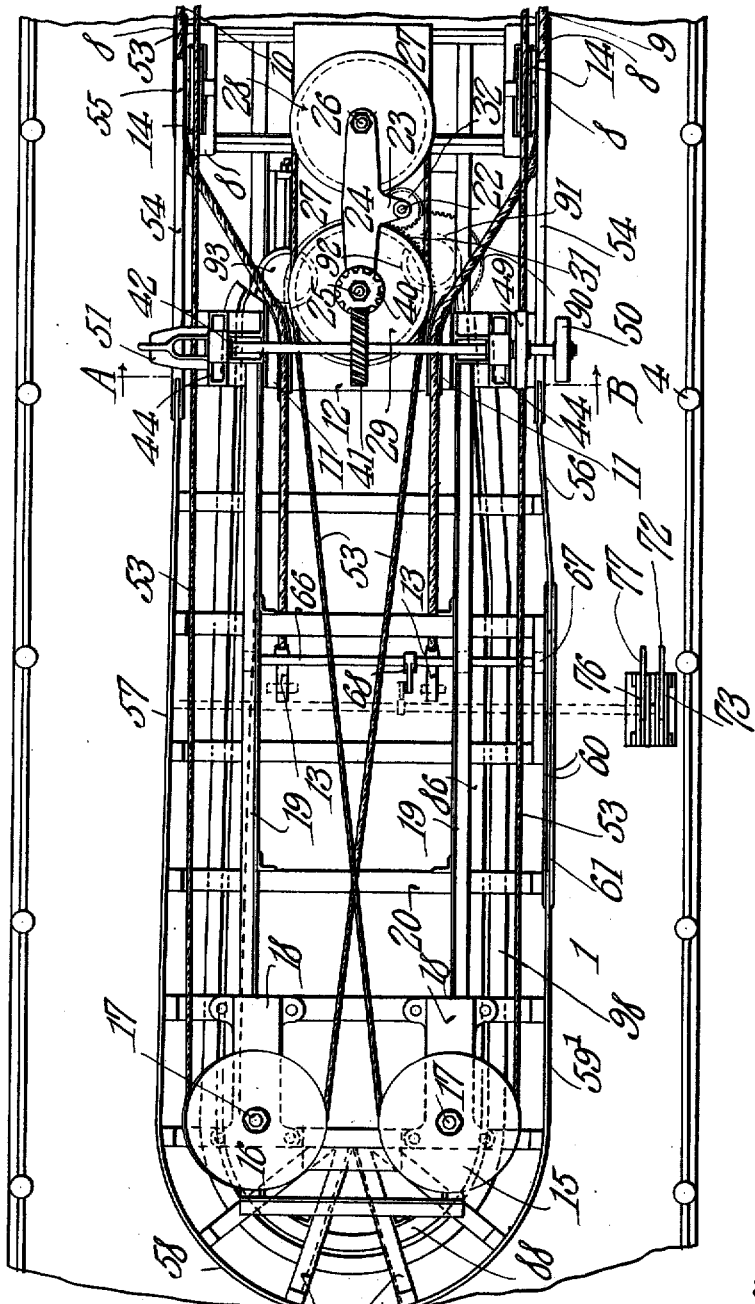

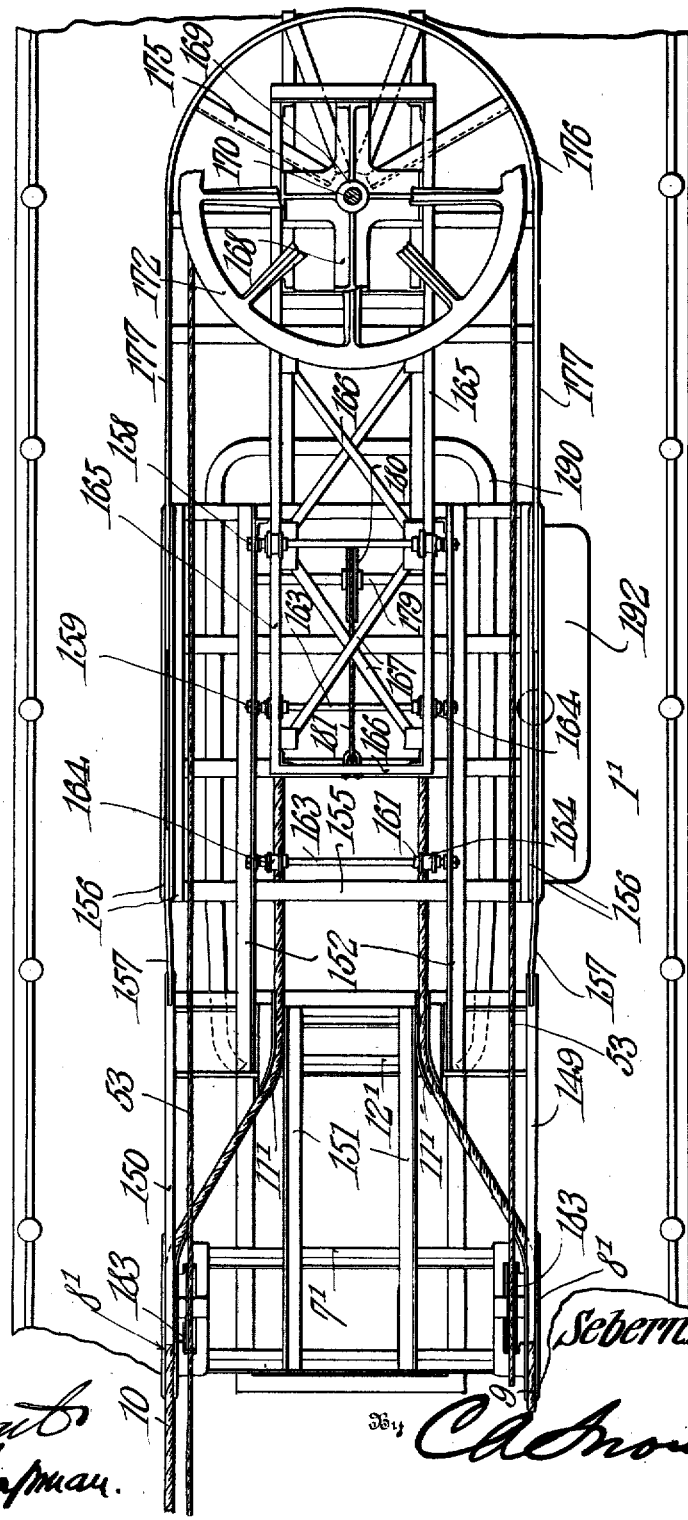

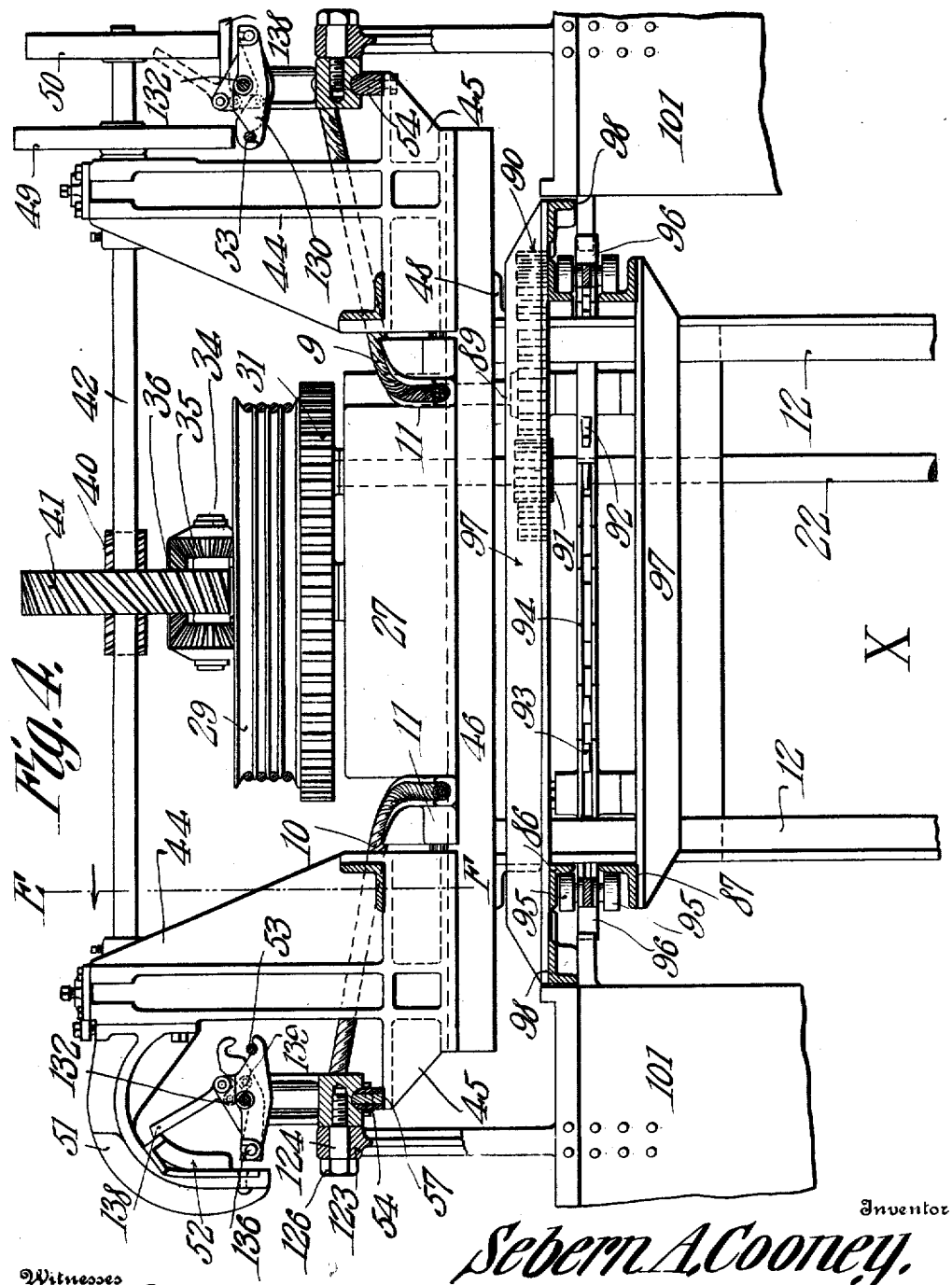

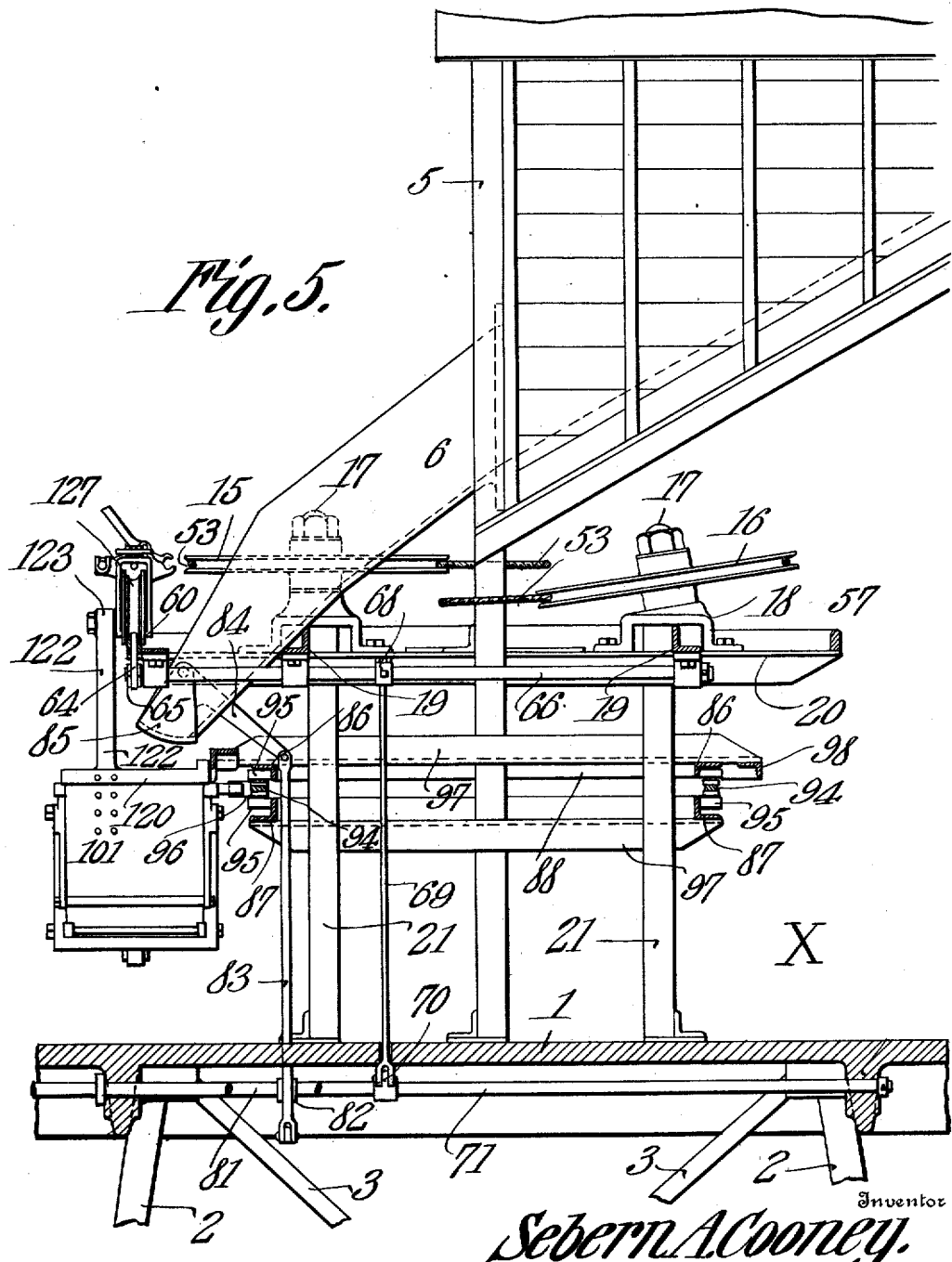

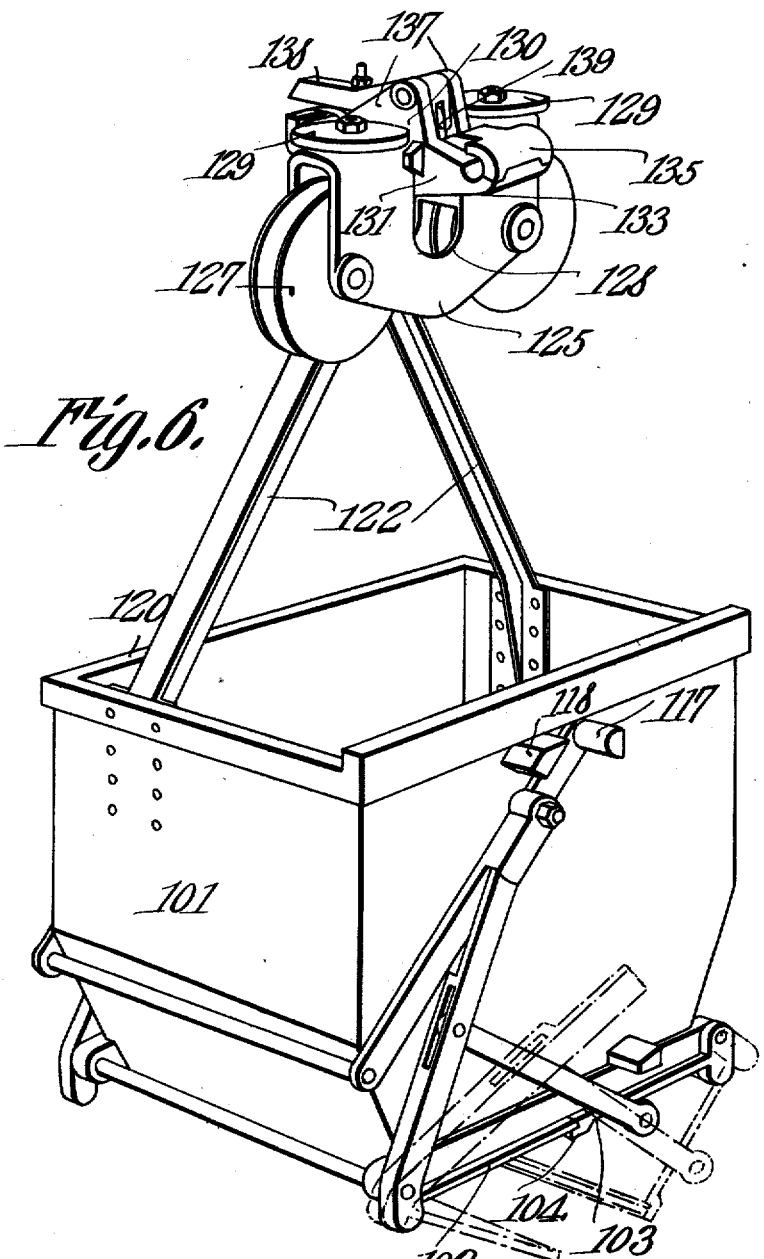

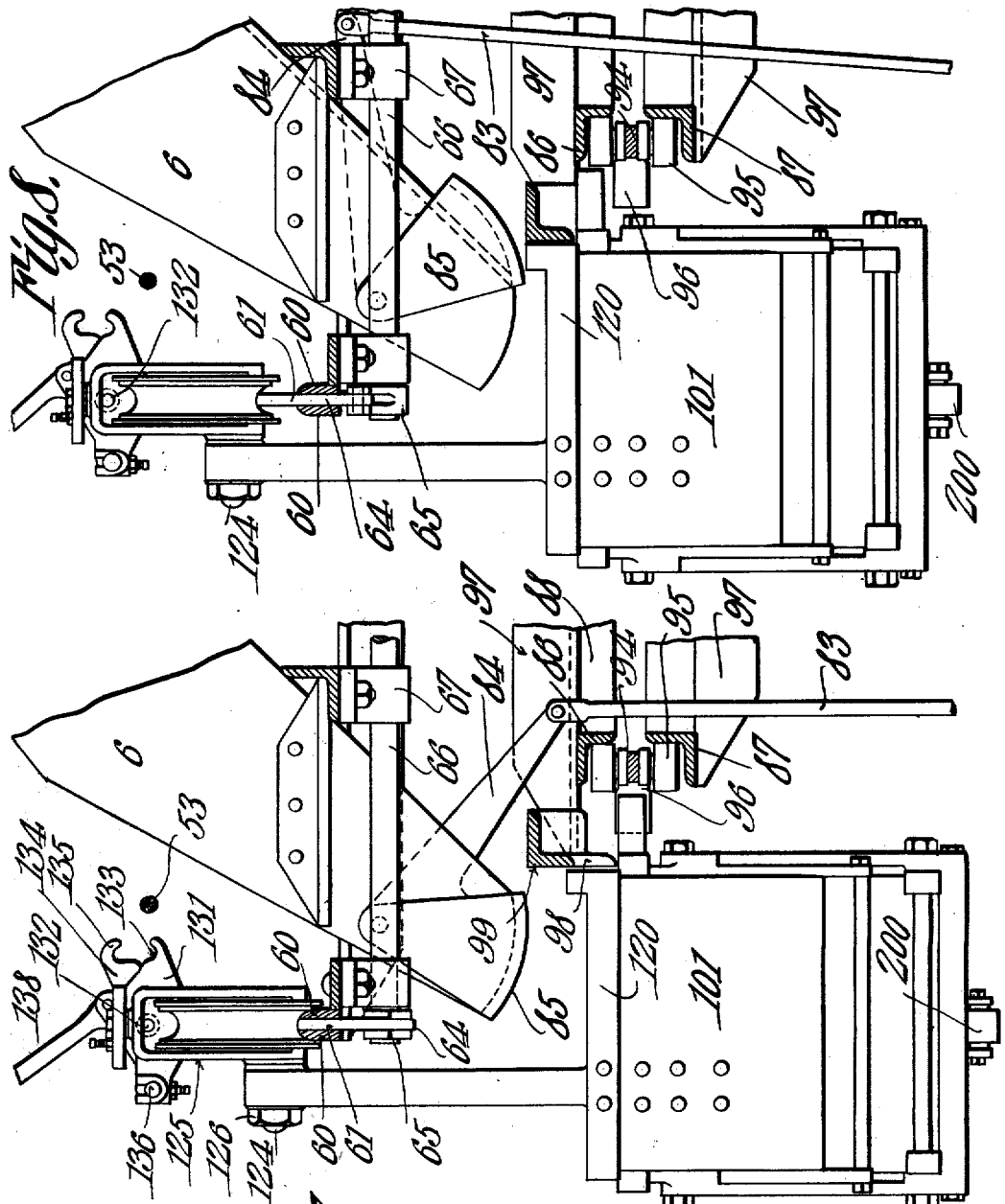

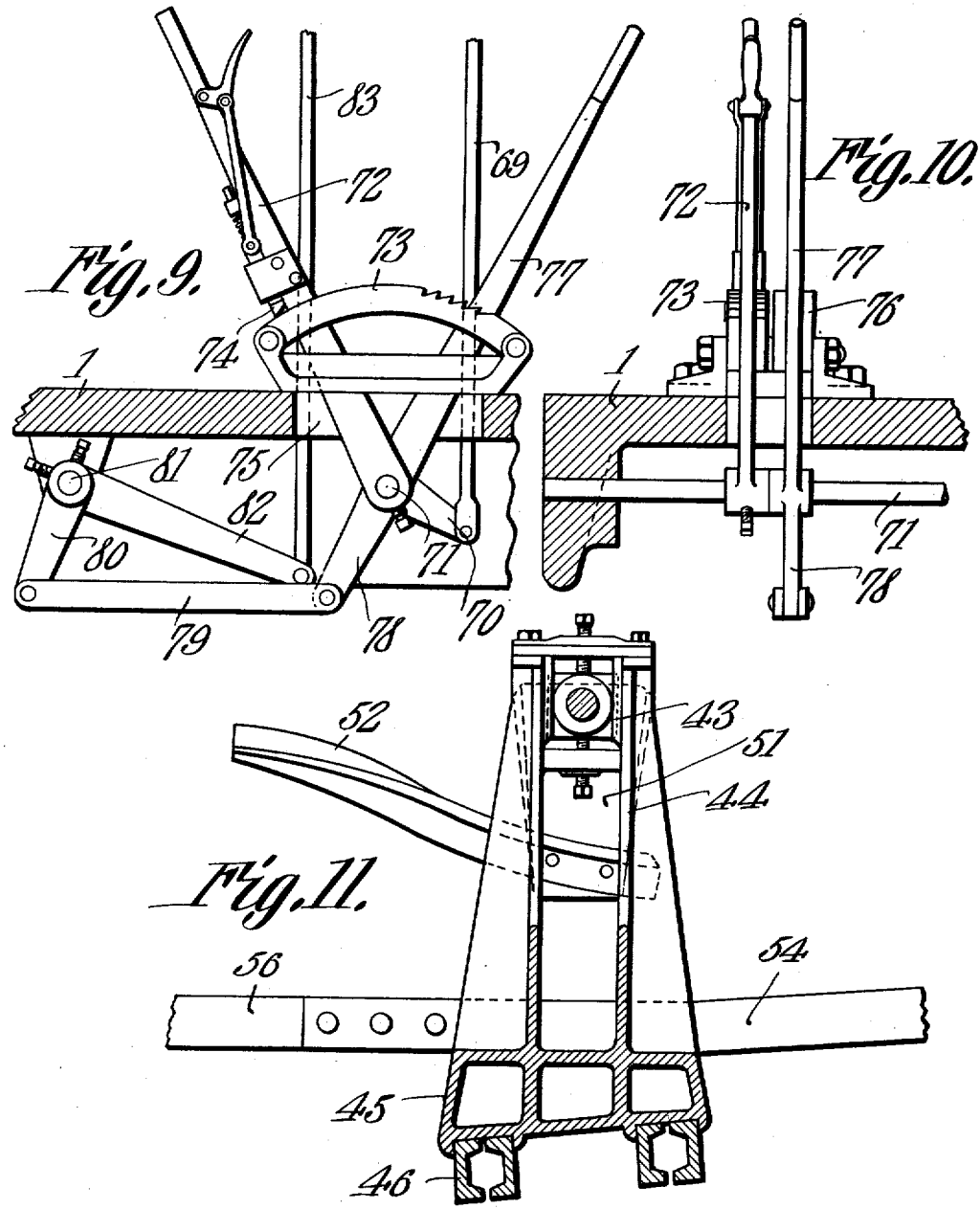

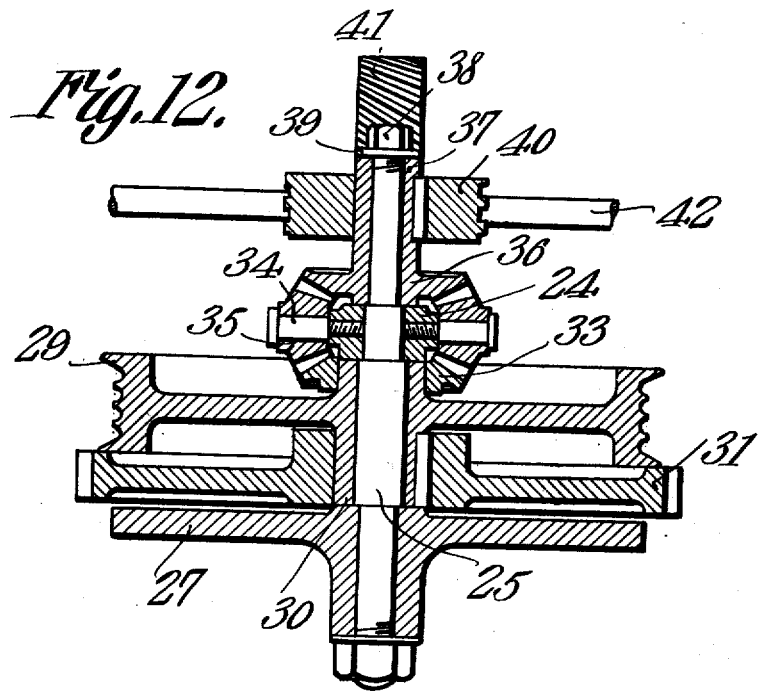
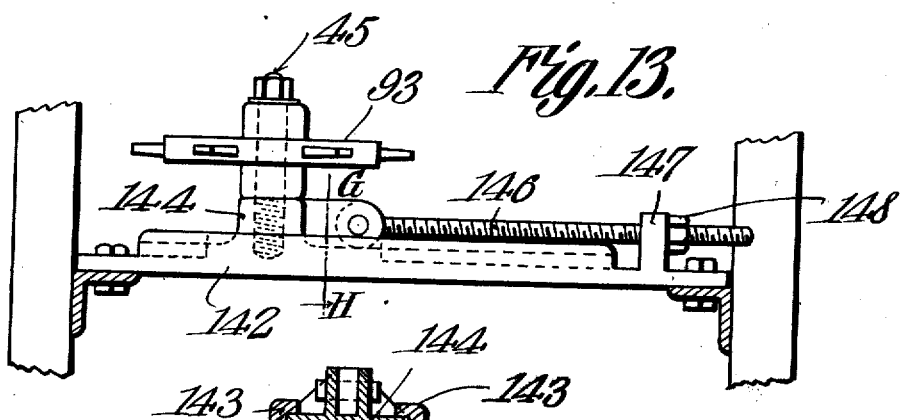

S. A. COONEY.
DOUBLE ROPE TRAMWAY.
APPLICATION FILED OCT. 14, 1909.
998,280.
Patented July 18, 1911.
14 SHEETS—SHEET 12.
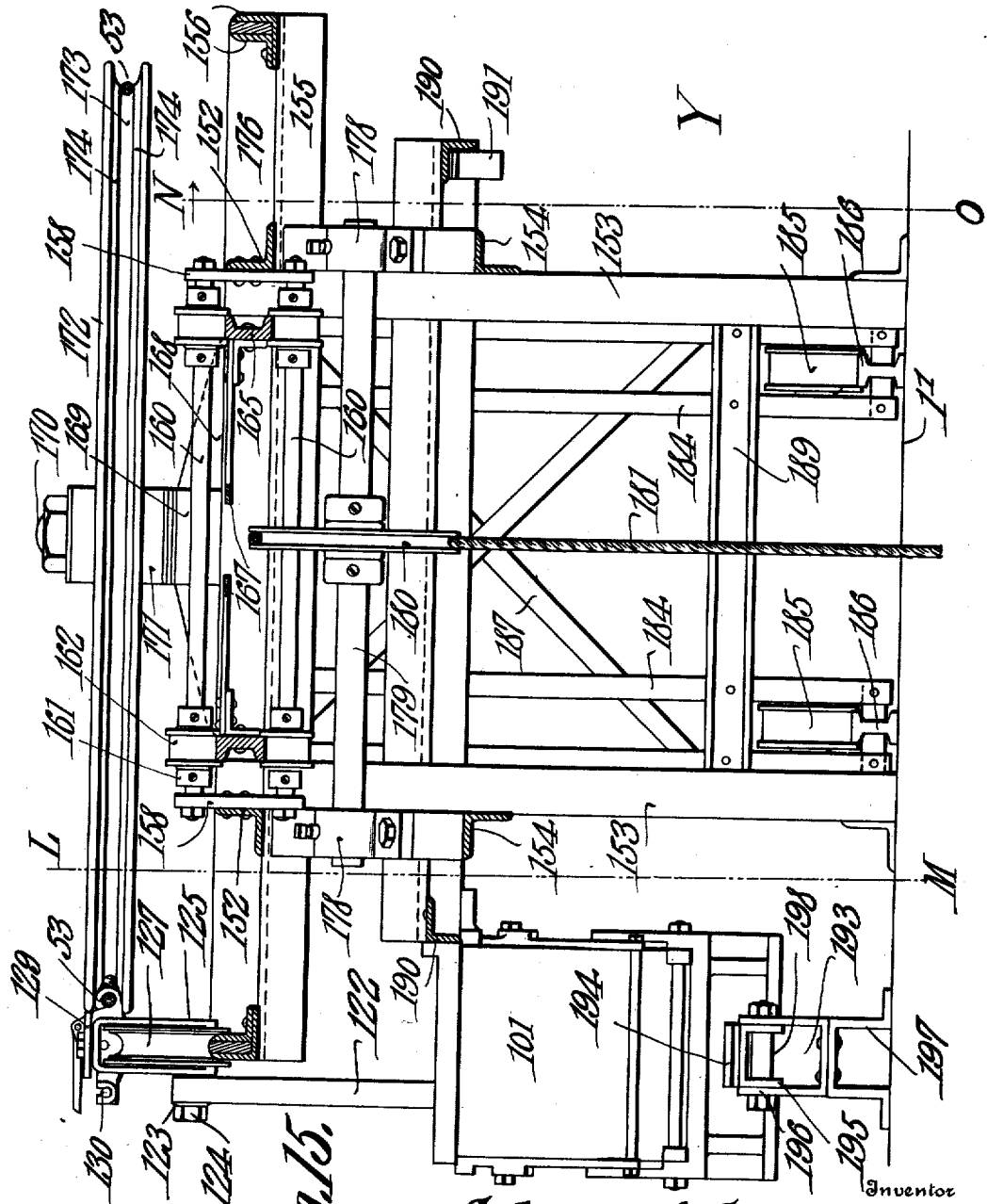

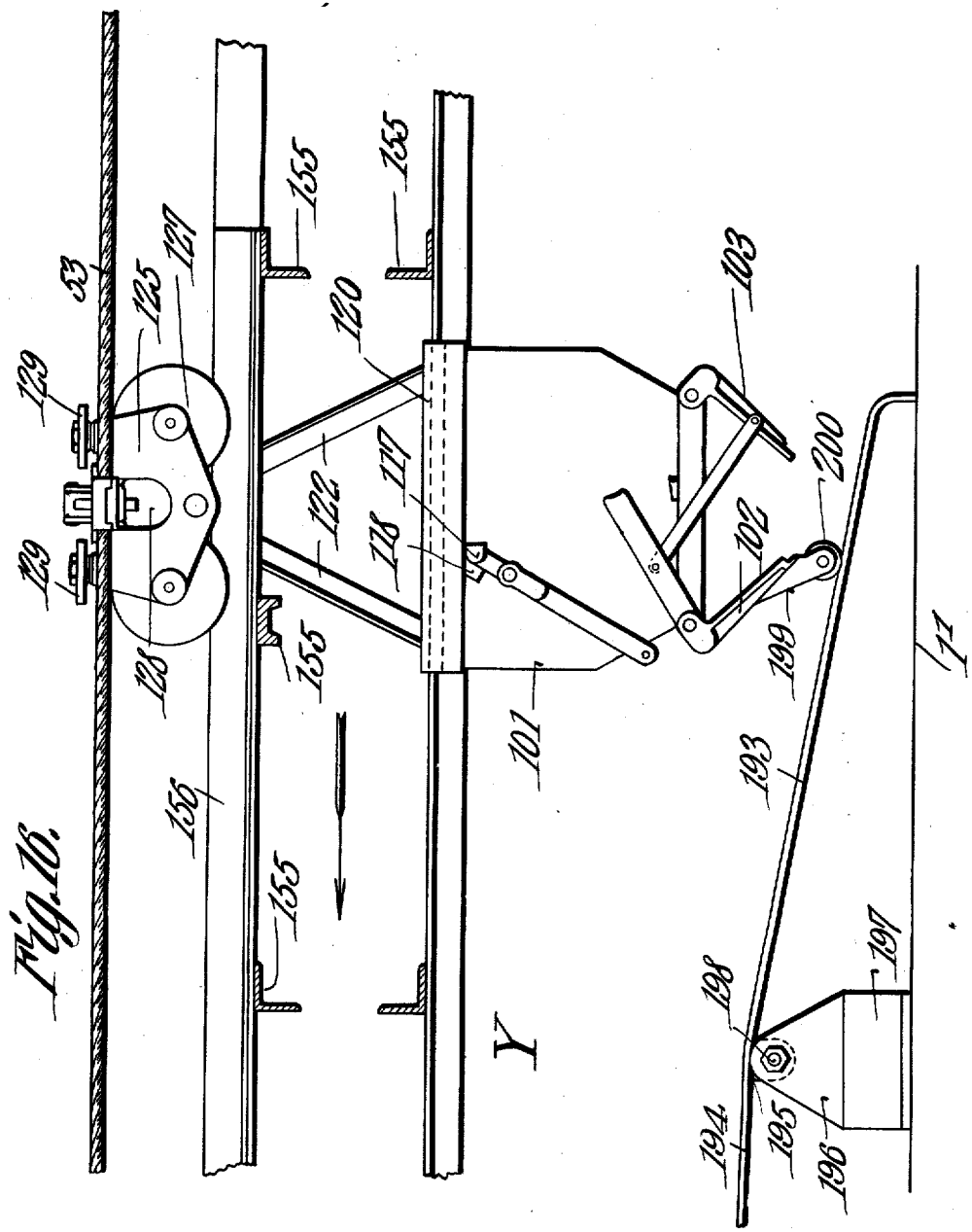

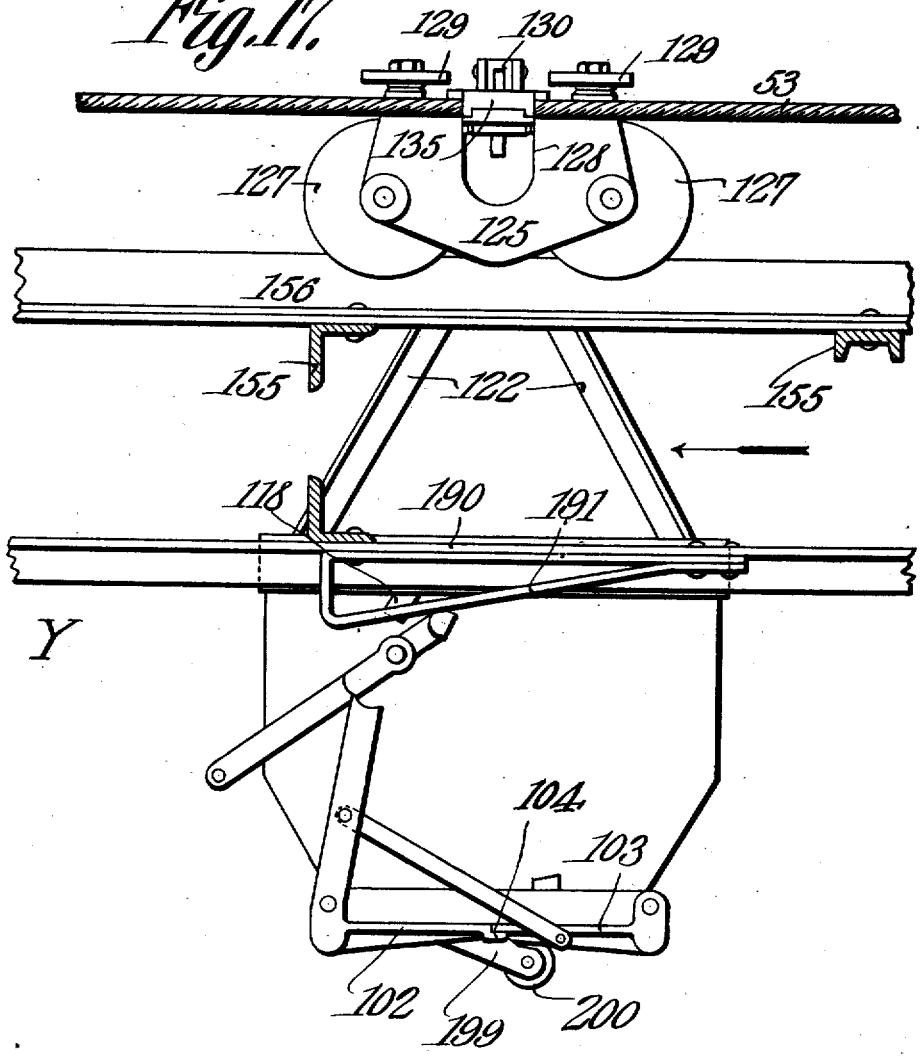

UNITED STATES PATENT OFFICE.

SEBERN A. COONEY, OF TRENTON, NEW JERSEY, ASSIGNOR OF ONE-HALF TO JOHN A. ROEBLING'S SONS CO., OF TRENTON, NEW JERSEY.

DOUBLE-ROPE TRAMWAY.

998,280.   Specification of Letters Patent.   Patented July 18, 1911.

Application filed October 14, 1909. Serial No. 522,662.

*To all whom it may concern:*

Be it known that I, SEBERN A. COONEY, a citizen of the United States, residing at Trenton, in the county of Mercer and State of New Jersey, have invented a new and useful Double-Rope Tramway, of which the following is a specification.

This invention has reference to double rope tramways having buckets or receptacles for transporting material from one place to another.

The object of the present invention is to provide a tramway wherein the outgoing and return tracks for the buckets are in the form of cables stretched between the receiving or loading and dumping or unloading stations or terminals, and the mechanism at the receiving and dumping stations is so arranged that a single operator may control the loading of the buckets while the dumping of the buckets at the distant station and all other operations are automatic.

In accordance with the present invention the tracks for the buckets or receptacles are, between the terminal stations, composed wholly or mainly of cables anchored at the terminal stations and to intermediate supports if the latter be found necessary. Comparatively great distances may be spanned by cables of sufficient size and strength so long as the route is direct. It is necessary, however, at times, to introduce curves, but such curves require a special construction which forms the subject matter of Letters Patent No. 972,509, dated October 11, 1910, and consequently need not be referred to herein.

In accordance with the present invention the buckets or receptacles are caused to move along the track by grips capable of grasping a power cable adjacent to but above the track cable, this feature being especially advantageous in connection with structures entering into the present invention.

At both the receiving and dumping terminal stations the cables are provided with suitable anchorages and where the track cables pass to the anchorages they meet the corresponding ends of track structures local to the respective stations. The local track structures drop or dip adjacent to the cable track terminals and also these local track structures widen out or diverge and at the ends remote from the cable track terminals the local tracks are connected by a curve.

In accordance with the present invention the power cable becomes inactive to the buckets or receptacles at the receiving station and a local drive is provided at such receiving station to engage and propel the buckets when released from the power cable, while means under the control of an operator are provided whereby the operator may stop the progress of the bucket in position to receive a load without, however, stopping either the power cable or the local drive. Furthermore, the operator is enabled to again cause the coupling of the buckets to the local drive and the latter then causes the movement of the buckets into operative relation to the power cable where mechanism of suitable construction causes the gripping of the bucket to the power cable through the intermediary of a suitable grip and the bucket is then carried by the power cable onto the outgoing cable track and to the dumping station. When a bucket approaches the receiving station and as it enters the local track thereat it is uncoupled or ungripped from the power cable to be subsequently engaged by the local drive and means are provided for insuring the proper position of the parts of the grip when the bucket is again brought into operative relation to the power cable on the outgoing run thereof. At the receiving station where the power cable driving drums are located, the same power source is utilized for the actuation of the grip closing mechanism at the outgoing end of the receiving station, wherefore the power-cable driving drums are located at the end of the receiving station adjacent to that connected to the track cables. At the dumping station the power cable is passed around an idler sheave which in turn is mounted upon a carriage under the constant control of tension means sufficient to maintain the power cable sufficiently taut. At the dumping station as well as at the receiving station provision is made for guiding the pendent buckets, while at the dumping station mechanism is provided for automatically causing the dumping side of the bucket to operate and to subsequently bring these parts to the closed position.

In accordance with the present invention a bucket carried gripping mechanism is provided and opening and closing means adapted thereto are located at the receiving station.

The invention will be best understood from a consideration of the following detail description taken in connection with the accompanying drawings forming a part of this specification in which drawings,—

Figure 1 is a perspective view of the receiving station. Fig. 2 is a side elevation of the receiving station, with some parts shown in section, the view being taken from the bucket loading side of the station. Fig. 2ª is a similar view of the dumping station. Fig. 3 is a plan view of the receiving station. Fig. 3ª is a plan view of the dumping station, some parts being shown broken away and in section. Fig. 4 is a section on the line A—B of Fig. 3, with buckets shown in position and in part in section, the showing of Fig. 4 being on a larger scale than that of Fig. 3. Fig. 5 is a section on the line C—D of Fig. 2, but on a larger scale and also showing a bucket in position. Fig. 6 is a perspective view of one of the buckets. Figs. 7 and 8 are detail sections similar to that of Fig. 5 but of less extent and showing different phases of the operation of the bucket-controlling means adjacent to the filling spout for the buckets. Fig. 9 is a detail view showing the levers under the control of the operator, in side elevation. Fig. 10 is an end elevation of the structure shown in Fig. 9. Fig. 11 is a detail section on the line E—F of Fig. 4. Fig. 12 is a vertical diametric section through one of the power cable driving drums and the transmission gear between the same and the grip closing mechanism. Fig. 13 is a detail elevation of one of the local drive sprocket idlers and adjusting means therefor. Fig. 14 is a section on the line G—H of Fig. 13. Fig. 15 is a section on the line I—K of Fig. 2ª but on a larger scale and also showing a bucket in position. Fig. 16 is a section on the line L—M of Fig. 15. Fig. 17 is a section on the line N—O of Fig. 15 showing a bucket approaching the dumping position.

Referring to the drawings, there are shown two stations which for convenience will be designated station X and station Y. At station X there is a platform 1 either mounted upon posts 2 connected by braces 3 after the manner of ordinary steel towers or other structures, or the platform 1 may be the floor of a suitable building, or the top of a masonry structure, or in fact this platform may be taken as typical of any suitable supporting structure. In the drawings the platform 1 is shown as provided with a protecting railing 4, but this is only illustrative since the railing will not be needed except on elevated structures, or in other structures where it is desirable to prevent accidental or careless approach to the mechanism. At station X there is shown a bin 5 which may be taken as typical of any suitable container for the reception and storage of material to be transported from station X to station Y as will hereinafter appear. Projecting from the lower portion of the bin 5 is a spout 6. It will be understood, of course, that the bin 5 and spout 6 may be of any approved construction and form no necessary part of the present invention. These members may therefore be replaced by any other suitable structures for the purpose, and, under some circumstances, may even be omitted. Considering the bin 5 as present it may be erected upon a suitable support rising from the platform 1 and located above certain mechanisms to be described.

Erected on the platform 1 near one end thereof is a pedestal or column 7 of open construction, being preferably made of angle or channel steel or both and at the top of this column at each side thereof there is secured a saddle 8 comprising a casting of suitable form secured to the column 7 and designed to receive and support a cable track. These tracks, there being an outgoing track 9 and an incoming track 10 at the station X, are formed preferably of steel cables or ropes. The track 9 constituting the outgoing track of station X extends to and constitutes the incoming track of station Y and there passes over a saddle 8' mounted on a column or support 7' similar to the corresponding parts at station X. The track 10 constituting the incoming track of station X also extends to station Y and constitutes the outgoing track of the last-named station, being supported by a corresponding saddle 8' mounted on the column 7'. The ends of the cable tracks 9—10 at each station, and entering the station and beyond the saddles 8 or 8' as the case may be, converge and are carried to other saddles 11 at the station X and 11' at the station Y, these saddles being supported upon pedestals 12 and 12' respectively. The pedestals 12 are somewhat shorter than the columns 7 and the pedestals 12' are shorter than the columns 7', so that the cable tracks 9 and 10 drop after leaving the saddles 8 and 8'. After the cable tracks leave the saddles 11 and 11' they are carried downward toward the platform 1 of station X and the platform 1' of station Y and are ultimately anchored by links 13 to appropriate points in the under structure of the respective platforms.

The cable tracks 9 and 10 may extend directly from station X to station Y, the size and strength of the cable being chosen for the distance spanned. If the distance between the stations X and Y be too great for a single span, then intermediate supports may be provided with or without anchorages, or there may be intermediate tension stations, or if it be necessary to locate station Y out of a direct unobstructed line with station X, then a suitable curve may be introduced, such curve structure forming the subject matter of another application, for which reason the curved structure is not illustrated in the drawings.

Mounted on the column 7 near the sides thereof and at the inner sides of the saddles 8 are sheaves 14 turning on horizontal axes and projecting above the plane of the tracks 9 and 10. Near the other end of the platform 1 are two other sheaves 15—16. The sheave 15 is mounted on a vertical axis while the sheave 16 is mounted on an inclined axis. The sheaves 15 and 16 are mounted on studs 17 supported upon plates or blocks 18 secured to a frame made up of longitudinal beams 19 and cross beams 20 erected on posts 21 rising from the platform 1, the longitudinal beams 19 extending to and connecting with the column 7 and pedestal 12. The framework made up of these beams 19 and 20 with the posts 21 serves as a support for structures at station X to be described.

Located adjacent to the column 7 is a power shaft 22, this shaft being shown in the drawings as a vertical shaft, but this arrangement may be changed as found expediment to meet differing conditions. The upper end of the shaft 22 is journaled in an offset 23 of a yoke 24, in the particular structure shown in the drawings, connecting two spaced arbors 25—26 rising from spaced points on a connecting frame 27 extending between the column 7 and pedestal 12 in the central longitudinal vertical plane of the frame 19—20.

Mounted on the arbor 26 is an idler drum 28 and mounted on the arbor 25 is another drum 29 for a purpose which will presently appear. The drum 29 is formed on one side with an elongated hub 30 to which is keyed a gear wheel 31 between the said drum and the frame 27. This gear wheel 31 is in mesh with a pinion 32 fast on the drive shaft 22. The hub of the drum 29 extends above the central web of this drum and there carries a bevel gear 33 immediately below the connecting yoke 24 which receives the arbor 25 at one end.

Journaled to the yoke 24 on opposite sides of the arbor 25, by means of journal studs 34 are bevel pinions 35 in mesh with the bevel gear 33, and in mesh with these pinions 35 is another bevel gear 36 journaled on the arbor 25 above the yoke 24, the gear 36 being preferably of the same size as the gear 33. The pinions 35 act to transfer motion from the gear 33 to the gear 36 around the yoke 24. The gear 36 on the side remote from the yoke 24 has an elongated hub 37 through which the arbor 25 extends and this arbor is threaded at the outer end to receive a nut 38 and washer 39 holding the gear 36 in place on said arbor. The hub 37 carries a skew gear wheel 40 meshing with another skew gear wheel 41 on a shaft 42 mounted in adjustable bearings 43 which in turn are supported in pedestals 44 having bases 45 of skeleton type secured to cross beams 46 directly carrying the saddles 11 and which extend laterally beyond the supports 12, the pedestals 44 being outside the saddles 11.

It will be observed that the beams 46 are shown as made of double channel steel and it will also be observed that the saddles 8 are mounted upon similar beams 47 on top the column 7 and the uprights of the column 7 and supports 12 as well as the beams 46 and 47 are connected by bars 48 which may be made of angle steel. These parts, which are shown in Figs. 1, 2, 3 and 4, in whole or in part, are designed to support the major part of the operating machinery and the weight of the cable tracks 9 and 10 and consequently the structures are made heavy and rigid.

The shaft 42 extends transversely of the length of the cable tracks 9 and 10 and the end of this shaft 42 toward the cable track 9 and beyond the corresponding bearing 43, carries two disks 49 and 50 in spaced parallel relation, with the disk 50 of smaller diameter than the disk 49. The purpose of these disks will appear hereinafter.

The bearing 43 for the shaft 42 carried by the pedestal 44 on the side of the structure adjacent to the cable track 10 carries an outwardly projecting overhanging bracket 51 having its outer end downwardly projecting in parallel relation to the outer face of the said pedestal 44 and this bracket there carries a guide arm 52 appropriately shaped. The purpose of this guide arm will appear hereinafter.

There is provided an endless power cable 53 extending between the two stations X and Y above but close to the track cables 9 and 10, and this power cable may, moreover, run inside the vertical planes of the two track cables 9 and 10.

Considering the power cable 53 and the station X and tracing it in the direction of its travel, it enters over the sheave 14 adjacent to the point of entrance of the track cable 10, thence the power cable passes adjacent to the outer face of the pedestal 44 beneath the bracket 51, thence around the sheave 16, partially encircling said sheave and returning toward the entrance end of station X but to the other side of the drum 29, thence around the latter and to the idler drum 28 and around between the two drums a suitable number of times, thence from the driving drum 29 to and around the sheave 15 and thence to and over the sheave 14, passing under the disk 49 in the vertical plane of the latter and from the sheave 14 passing toward the other station Y where it is directed in a manner to be hereinafter described.

Secured at one to each saddle 8 and at the other end to the outer ends of the spaced members 45 of the pedestals 44 are track sections 54, each having an end 55 thinned out or tapering and partially embracing the corresponding cable track 9 or 10 as the case may be, so that a wheel running on the cable track will find ready access to the track section 54 which constitutes a continuation of the cable track. Between the column 7 and support 12 the track section 54 dips so that the end supported by the pedestal 45 is lower than the end supported by the corresponding saddle 8.

Connected at one end to the end of the track section 54 leading from the cable track 9, which end of the track section is remote from the cable track, is another track section 56 which may be in the form of a metal strip set on edge and this track section 56 is bent outwardly so that the end remote from the track section 54 is more distant from the power cable 53 than is said track section 54.

Connected to the end of the track section 54 forming a continuation of the cable track 10, at the end of said track section 54 remote from the end thereof adjacent to the cable track 10 is a track section 57 connected to the outer ends of the beams 20 on the corresponding side of the structure and slowly divergent from the vertical plane of the run of the power cable 53 entering station X, which run is parallel with the run of the same cable passing out of the said station. The track section 57 is bent into a semicircle as shown at 58, around that end of the frame 19—20 carrying the sheaves 15—16, the track at this point being carried by radial arms 59 projecting from the corresponding end of the frame 19—20. The track 57 after leaving the curved portion 58 is continued substantially parallel with the outgoing run of the cable toward the track section 56 but terminates some distance therefrom, the continuation of the track section 57 beyond the curve 58 being indicated at 59'.

The adjacent ends of the track sections 56 and 59' are connected by two spaced parallel bars 60 secured to the corresponding ends of adjacent cross beams 20. Located between the two bars 60 is another bar 61 of about the same thickness as the track sections 56 and 59' and this bar 61 is pivoted to the bars 60 adjacent to the point of connection therewith of the corresponding end of the track section 59', the pivot being indicated at 62 in Figs. 1 and 2. The bar 61 constitutes an elevating track section movable above the upper edges of the bars 60 and for a portion of its length the track section 61 is so shaped that when in the elevated position its upper surface, indicated at 63, is parallel with the upper surface of the track sections 56 and 59' and with the connecting bars 60 which latter, when the section 61 is in the lowered position form a continuation of the track sections 56 and 59 on a level therewith. The location of the pivoted section 61 is such that its portion 63 is opposite the spout 6 for a purpose which will presently appear.

Provision is made for the elevating or depressing of the track section 61 at the will of an operator. For this purpose the end of the track section 61 remote from the pivot 62 is provided with a downward projection 64 entering between two ears on one end of a rock arm 65 on one end of a rock shaft 66 projecting alongside of the spout 6 and provided with suitable journal bearings 67 secured to the main frame of the structure at this station. The rock shaft 66 has also secured to it a rock arm 68, and this rock arm is connected by a link 69 extending downward through the platform 1 and there connected to another rock arm 70 on a shaft 71 having journal bearings beneath the platform 1.

At an appropriate point on the platform 1 to one side of the track section 61 the shaft 71 has secured thereto a manipulating lever 72 working in operative relation to a rack segment 73, the said lever carrying a latch 74 adapted to the teeth of the rack segment 73. The lever 72 projects upwardly through a suitable slot 75 in the platform 1. As shown in Fig. 10 the rack segment 73 is made up of two parallel members in spaced relation and between these two members the lever 72 is guided. There is supported adjacent to the rack 73 two other spaced parallel members 76 serving to guide a lever 77 close to the lever 72. The lever 77, which is a hand lever, is mounted on the shaft 71 but is free to turn thereon. This lever has a short extension 78 connected by a link 79 to an arm 80 fast on a shaft 81 journaled beneath the platform 1 and extending parallel with the shaft 71. The shaft 81 carries a rock arm 82 connected by a link 83 extending up through the platform 1 to a rock arm 84 fast to a pivoted gate 85 normally closing the discharge end of the spout 6. By means of the two levers 72—77, which are closely adjacent one to the other and both within easy reach of an operator, the track section 61 may be raised or lowered and the gate 85 may be moved to the open or the closed position at will.

Secured to the uprights 21 at a distance below the longitudinal beams 19 are angle strips 86 and 87 with matching webs in the same vertical plane and the angle extensions parallel and spaced one from the other, the webs in the same vertical plane being also spaced one from the other. These angle strips 86 and 87 extend from the support 12 where their ends are slightly inturned to the other end of the structure where they join a semicircular corresponding set of strips 88 forming continuations of the respective strips 86 and 87, the whole being formed integral or not as may be desired. The strips 86 and 87 with the end continuations 88 form a track disposed below but parallel with the track sections 57, 58, 59', 60 and 56.

Suitably journaled in the supporting members of the framework structure adjacent to the support 12 and between the same and the column 7 is a shaft 89 carrying a gear wheel 90 meshing with a pinion 91 on the main drive shaft 22. The shaft 89 carries a sprocket wheel 92 secured to the gear wheel 90 to turn therewith. The sprocket wheel 92 is so located that one side thereof is in alinement with the track formed by the strips 86 and 87 on the side of the structure receiving the track cable 9 while on the other side of the structure there is mounted an idler sprocket wheel 93 in line with the track strips 86 and 87 on the corresponding side of the structure.

An endless sprocket chain 94 extends between the sprocket wheels 92 and 93 and along the angle strips 86 and 87 and about the connecting curve 88 at the end of the structure remote from the sprocket wheels 92 and 93. At suitable intervals the chain 94 carries rollers 95 above and below the runs of the chain and these rollers engage the webs of the strips 86 and 87 in vertical alinement and as the chain is caused to travel by virtue of the rotation of the sprocket wheel 92 these rollers move along the tracks formed by the strips 86 and 87 and the end continuation 88 thereby greatly reducing friction. At intervals the chain 94 carries outwardly projecting clips 96 for a purpose which will presently appear.

Because of the gradually increasing distance between the two sides of the tracks formed by the strips 86 and 87 as they approach the curve 88, suitable sustaining cross beams 97 are secured to the uprights 21 and form the direct means of upholding the members 86 and 87. Those cross beams 97 which sustain the strips 86 are extended laterally therebeyond and have secured to them in parallel relation with the strips 86, other angle strips 98 having one web downwardly extended.

At a point beneath the track section 60 to which the movable track section 61 is pivoted, the angle strip 98 has an upward curve indicated at 99, the upward curve of this section 99 conforming to the general shape of the upper edge of the track 61 when in elevated position and the under edge of the downwardly extended web of the section 99 has a level portion 100 agreeing with the level portion 63 of the pivoted section 61 when the latter is in elevated position.

When the system is in operation the shaft 22 is continuously rotating and through the pinion 32 and gear 31 motion is imparted to the drum 29 and by the latter to the power cable 53, the latter being thereby caused to travel continuously at as high a speed as may be found expedient. By proportioning the pinion 91, gear wheel 90 and sprocket wheel 92 the desired speed may be imparted continuously to the sprocket chain 94. In practice it is desirable that the speed of the sprocket chain 94 should be comparatively slow and in fact, considerably slower than the speed of the power cable 53.

In the present system forming the subject matter of this invention, material allowed to escape through the spout 6 is received in buckets 101, one of which is best shown in Fig. 6, but these buckets also appear in other figures. Each bucket is an independent unit except that several buckets may be used in the system at one time and may be connected to and travel with the power cable 53. The bucket 101 is rectangular in shape in the form shown in the drawings, but of course the bucket may be otherwise shaped if so desired. As shown, the ends of the buckets near the bottoms thereof approach and the bottom of the bucket is closed by gates 102 and 103 meeting at a middle point of the bucket, one of the gates being provided at the meeting edge with an overlapping strip 104. The means for locking the gates of the bucket in the closed position form no part of the present invention and are therefore not described in detail herein and are to be taken as typical of any suitable means for the purpose. There are certain features of the bucket structure which are included in the present invention and these will be referred to from time to time. One of these features is a laterally projecting stud 117 on a part of the gate locking mechanism and a stop projection 118 in the bucket in the path of the stud 117.

The bucket body is sustained by a bail 122 shown in the drawings as formed of T-strips approaching each other toward the upper ends and there united in a trunnion block 123 through which there extends a pivot stud or trunnion 124 connecting the lower ends of a U-shaped frame 125, the stud 124 receiving a retaining nut 126. The frame 125 carries two spaced grooved wheels 127 in tandem relation, the wheels being suitably mounted in the frame for rotation therein. Between these wheels, which are sufficiently spaced for the purpose, the frame 125 is provided with a recess 128 open at the top for a purpose which will presently appear. Above each wheel 127 the frame 125 carries a roller 129 mounted to rotate about a vertical axis.

Mounted upon the frame 125 within the slot 128 is one jaw of a grip 130, this jaw being in the form a block 131 supported by trunnions 132 in suitable bearings carried by the frame 125 on each side of the slot 128. The block 131 at one end is formed with a clamp jaw 133 adapted to grasp the power cable 53. The block 131 is cut away centrally to receive a lever 134 formed at one end with a gripping jaw 135 matching the jaw 133 and together with the latter adapted to embrace the power cable 53 with sufficient force to secure the bucket 101 thereto. The lever 134 is formed at the end remote from the jaw 135 with trunnions 136 having bearings in the corresponding end of the block 131.

On one side of the block 131 about midway of its length are two spaced ears 137 in which is pivotally supported an angle lever 138. The short end of the lever 138 extends between the ears 137 and is connected by a link 139 to an adjacent portion of the lever 134, the lever 138 and link 139 co-acting to constitute a toggle lever for forcing the jaw 135 toward the jaw 133 and so firmly clamp the cable 53 between them and for locking the jaws in the closed position. The end of the lever 138 remote from that connected to the link 139 is sufficiently extended to be brought into engagement with the curved arm 52 of the bracket 51 in such manner that as the grip is carried along by the cable the arm 138 will be lifted and through the intermediary of the link 139 cause the lever 134 to be moved about its pivot in a direction to carry the jaw 135 away from the jaw 133 and thus ungrip the cable 53. The engagement of the arm 52 with the lever 138 occurs when a bucket enters the station X after leaving the cable track 10 and entering upon the track section 54 and just prior to reaching the track section 57. Under the conditions assumed the bucket is supposed to be returning empty from the station Y to the station X to be filled again. As soon as it has passed the ungripping arm 52, the bucket under the momentum imparted thereto by the rapidly moving cable 53 passes along the track section 57 but with constantly slowing speed since it has now been loosened from the power cable 53. The drop in the track section 54 and the outward trend of the track section 57 has carried the grip clear from the cable 53. The slower moving sprocket chain 94 soon overtakes in speed the idle bucket and a clip 96 on the chain ultimately comes in contact with the lug 118 on the bucket, the clip and lug now being in approximately the same horizontal plane because of the drop of the bucket due to the dip in the local track. Now the bucket is moved along the track 57 and about the curve 58 and onto the track section 59' by the impelling action of the comparatively slow-moving sprocket chain 94. Before the bucket reaches the track section 61, the operator, by a proper manipulation of the hand lever 72, causes the elevation of the end of the track section 61 remote from the pivot 62 so that the upper edge 63 is approximately horizontal, the track section 61 being held in the elevated position by the engagement of the thumb latch 74 with the ratchet teeth of the segmental rack 73. When the bucket reaches the track section 61, now elevated, the wheels 127 will follow the elevated track section 61 and the bucket 101 will be correspondingly elevated and will finally come to rest upon the horizontal edge 63 of the track section 61. There is no danger of the grip coming into engagement with the adjacent run of the power cable 53 when the bucket is elevated by the track section 61 since this track section is displaced laterally from the vertical plane of the said run of the cable 53 to a sufficient extent to keep the grip well away from the cable 53.

The general relation of the buckets to the sprocket chain 94, spout 6, track sections 60 and 61, and power cable 53, when the track section 61 is in the lowered position is indicated in Fig. 7, while the relation of the same parts when the track section 61 is elevated and the wheels 127 are thereupon and in engagement with the edge 63, is shown in Fig. 8.

It will be observed that during the time the bucket 101 is under the control of the sprocket chain 94, the flange 120 is in close relation to the angle guide strip 98 while the lug 118 is immediately beneath the lower edge of the downturned web of the angle strip 98, and when the bucket is elevated by running up on the track section 61 when the latter is in the elevated position, the lug 118 follows closely under the lower edge of the downturned web of the upbent portion 99 of the guide angle strip 98. Since the bucket is hung pendently by the bail 122 from the trunnion 124 it has a tendency to swing about an axis transverse to the vertical plane of the line of travel, but this is prevented, that is the swinging of the bucket to any material extent, by engagement of the lug 118 with the under edge of the downturned web of the guide strip 98. When the bucket 101 is elevated by running up on the track section 61 when the latter is in the raised position, the lug 118 is carried upward out of the path of the particular clip 96 on the sprocket chain 94 previously in engagement therewith. The actuating power for the bucket 101 being disconnected from said bucket, the latter quickly comes to rest upon the horizontal portion 63 of the track section 61. The operator may now manipulate the hand lever 77 in a direction to cause the opening of the gate 85 at the end of the spout 6 and material from the bin or container 5 will gravitate through the spout 6 into the bucket 101 then under said spout. As soon as the bucket has become full the operator will move the hand lever 77 in a direction to cause the gate 85 to close the discharge end of the spout 6 and so cut off the flow of material into the bucket. The operator now loosens the hand lever 72 by lifting the latch 74 out of engagement with the teeth of the segmental rack 73 and the weight of the bucket and the material therein causes the lowering of the track section 61 until the wheels 127 rest on the track members 60, and the lug 118 is again in the path of the clips 96 on the sprocket chain 94 and when one of these clips 96 is brought into engagement with the lug projecting from the bucket, the latter is propelled forwardly toward the outgoing cable track 9. The filled bucket is now carried onto the track section 56 and because of the lateral bend of said track section, the grip is moved toward the adjacent run of the power cable 53 so that the said run enters between the grip jaws. Since it is possible that the grip may have become closed after having been opened by the arm 52 at the receiving end of station X and before it is again moved into operative relation to the power cable, another finger 140 is mounted on the framework adjacent to the free end of the track section 61 so as to engage under the free end of the lever 138 should the latter have dropped, and again raises it so as to separate the gripping jaws. This finger 140 has a continuation 141 in the direction of travel of the bucket and conforming in shape to the shape of the track section 56 so that the gripping jaws are maintained open positively during this portion of the travel of the bucket. The extension 141 terminates, however, before the grip is brought into operative relation to the disks 49 and 50, the disk 49 being in the path of the jaw end of the lever or arm 134 and the disk 50 being in the path of the free end of the lever 138. When the grip reaches the disks 49 and 50 the jaw 133 is underriding the adjacent run of the power cable 53 and when the grip is engaged by the disks 49 and 50 the jaw 135 is brought into operative engagement with the power cable 53 and the lever 138 is moved by the disk 50 in a direction tending to close the gripping jaws firmly upon the cable 53 and lock them in the active position. The bucket is now carried by the cable 53 along the track section 54 and ultimately upon the cable track 9 and begins its journey to station Y.

It will be understood that the buckets may be sufficiently numerous to follow each other at intervals permitting the stopping of the bucket, the filling of the same, and the starting of the bucket again on its journey away from station X toward station Y.

It may become desirable to adjust the tension of the sprocket chain 94 or to restore the tension thereof should the chain wear. For this purpose the sprocket wheel 93 may be mounted as indicated in Figs. 13 and 14. Secured to appropriate parts of the main frame there is a frame 142 provided along opposite edges with overhanging flanges 143 between which is movable a carriage 144 upon which is secured a stud bolt 145 constituting a journal about which the sprocket wheel 93 is capable of freely turning. Secured to the carriage 144 is a threaded rod 146 extending through an ear 147 on the frame 142 and this rod 146 receives a nut 148 adapted to engage the ear 147 and by means of which the rod 146 may be drawn through the ear 147 and so move the carriage 144 in an appropriate direction to put the desired tension on the sprocket chain, since the sprocket wheel 93 participates in the movement of the carriage 144.

Referring now to the station Y it will be seen that where the cable track 9 passes to its anchorage from the saddle 8' there is a track section 149 inclined downward for a short distance, and leading from the cable track 10 where it engages the corresponding saddle 8' on its passage to the anchorage, there is a similar track section 150 also inclined downwardly.

The column 7' and supporting frame 12' are connected together by longitudinal beams 151 and leading from the support 12' are other longitudinal parallel beams 152 supported on posts 153 which latter are connected by braces 154. The beams 152 and posts 153 support cross members 155 which at their outer ends are connected by other longitudinal beams 156 made up of two spaced parallel members rounded on the upper edge into conformity with the grooves in the wheels 127 so that these members 156 are in effect track sections. The track sections 156 are spaced apart to a somewhat greater extent than the track sections 149 and 150 and the contiguous ends of the track sections 149 and the adjacent track section 156 and also the track section 150 and the adjacent track section 156 are connected together by outwardly bent track sections 157, these track sections 157 entering between the two members of the track sections 156 and may be there secured. At appropriate points the longitudinal beams 152 have secured thereto plates 158, 159, the plates 158 extending both above and below the longitudinal beams 152 and the plates 159 extending below these beams only. The plates 158, of which there is but one pair in the structure shown in the drawings, have secured thereto both above and below the beams 152, parallel rods 160 in turn parallel to the cross beams 155. These rods carry spaced collars 161 adjacent to each plate 158 and between each pair of collars there is confined a flanged roller 162 capable of rotating freely on the rod 160 but prevented from moving longitudinally on the rod by the collars 161, although these collars by being adjustable permit the proper adjustment and placing of the rollers 162 on the rods 160. The plates 159 each carry the corresponding end of a rod 163 below the beams 152 and on each rod 163 near the plates 159 are flanged rollers 164 like the rollers 162 and held in place on the rods 163 by collars 161. The rollers 162 and 164 serve as guide and supporting rollers for a rectangular frame made up of side channel beams 165 and cross beams 166 with crossed braces 167 where needed.

Secured to the side members 165 and cross members 166 at the end of the frame remote from that engaging the rollers 162 and 164 is a casting 168 formed with a central boss 169 from which rises a stud 170 receiving the hub 171 of a sheave 172, the rim of which is formed with a groove 173 adapted to receive the power cable 53 and this groove is flanked by other grooves 174 which together are shaped to receive the jaw end of the grips when in operative relation about the power cable 53. The frame carrying the sheave 172 is provided with radial arms 175 carrying a curved section 176 of track, which curved section has at its ends continuations 177 extending to and entering between the two members of the track sections 156, the upper edge of the track sections 176 and 177 conforming in cross section to the general shape of the track sections 156.

One of the braces 154 on each side of the stationary part of the frame structure at station Y carries a journal bearing 178 for a shaft 179 at the center of which shaft there is secured a grooved pulley 180. A cable 181 is made fast at one end to the cross member 166 remote from the sheave 172 and this rope or cable 181 is passed over the pulley 180 and thence downward through the platform 1' and below the same carries a suitable weight 182, it being understood that the platform 1' is supported upon suitable trestle work as indicated. Of course, the weight 182 may be above the platform 1' when there is sufficient space to accommodate it, or in case the platform 1' is the floor of a building then the weight 182 may enter a suitable pit excavated for the purpose. The tendency of the weight 182 is to move the frame carrying the sheave 172 in a direction to maintain the power cable 53 at all times sufficiently taut, the rollers 162 and 164 permitting this movement without undue friction.

Where the power cable 53 enters the station Y it is carried over appropriately located supporting sheaves 183, the cable entering the station over one sheave 183 and leaving the station over the other sheave 183, these sheaves being located adjacent to the saddles 8' supporting the corresponding ends of the cable tracks 9 and 10.

The end of the frame supporting the sheave 172 has beneath the sheave spaced legs 184 and each of these legs near the lower end carriers a flanged roller 185 adapted to a track rail 186 on the platform 1' and extending in the direction of travel of the sheave carrying frame. Suitable braces 187 and 188 serve to stiffen this part of the structure and the legs at the lower end are furthermore braced by cross pieces 189.

When a bucket 101 enters the station Y over the track cable 9 it passes on to the track section 149, thence onto the track section 157 and from thence to the track section 156 and continues from the latter to the track sections 177, 176, 177 and thence to the track section 156 on the other side of the station from which it passes by the track section 157 to the track section 150 and out of the station onto the return cable track 10, the grip retaining its hold on the power cable 53 at all times during the travel of the bucket through station Y. A guide strip 190 is arranged to be engaged by the flange 120 of the bucket while the bucket is passing along the track sections 157 and 156 at each side of the station, this guide 190 tending to prevent the bucket from swinging in toward center line of the station and the said guide strip is also provided with a downwardly extending flange, the strip being an angle strip, to engage the stud 118 and prevent the bucket from swinging in the direction of travel. The guide strip 190 on the entering side of station Y carries an incline 191 which may be made up of a metal strip appropriately bent and this incline is in the path of the stud or projection 117 on the gate lock of the bucket. The function of the incline 191 is to cause the release of the gates 102 and 103 and their weight augmented by the weight of the material within the bucket causes these gates to drop, and the contents of the bucket thereupon gravitate to a suitable hopper 192 or other suitable receptacle for the discharged contents of the buckets. After the bucket is dumped it continues on around the sheave 172 and then returns along the other side of station Y toward the return cable track 10.

On the platform 1' there is mounted an inclined plane formed of a strip 193 rising from the platform in the return path of the bucket and then rounding and continuing at a slight incline and finally terminating in a nearly horizontal portion 194. At the junction of the inclined portion with the nearly horizontal portion the incline 193 is provided with downwardly projecting ears 195 extending between other ears 196 erected on a support 197 mounted on the platform 1'. A bolt 198 serves to secure this end of the incline 193 to the support 197, the said bolt passing through the ears 195 and 196. On the bottom of the gate 102 there are projecting ears 199 and between these ears there is mounted a roller 200. When the gates 102 and 103 are in the pendent or open position the incline 193 is in the path of the roller 200 so that when this incline is reached by the bucket the roller 200 and with it the gate 102 are elevated. This causes the simultaneous closing and locking of the gates 102 and 103. The length and inclination of the incline 193 is sufficient to cause this movement of the parts and by the time the roller 200 reaches the horizontal portion 194 the gates 102 and 103 have been moved to the closed position and there locked, to remain locked until again released by the releasing incline 191. The bucket therefore on leaving station Y is ready to receive another load which it does on reaching the track section 61, assuming that this track section is in the elevated position. Should it occur that the operator desires that the bucket shall return to station Y empty then the track section 61 is not elevated and the gate 85 is not opened and the bucket instead of being temporarily released from the chain 94, continues onto the outgoing cable track 9 after being gripped to the power cable 53, as before described.

The dip of the local track adjacent to the sheaves 14 at station X and the sheaves 183 at station Y permits the power cable 53 to drop onto the supporting sheaves immediately the bucket enters a station, the relative position of the grip to the bottoms of the wheels 127 being such that as the bucket approaches the said sheaves while on the cable track that the cable 53 is elevated above the sheaves so that the grips shall not come in engagement with said sheaves. When a bucket at either station is approaching the outgoing side of such station then the elevation of the track sections as they approach the outgoing cable track causes the lifting of the grip and the power cable therewith sufficiently to clear the power cable supporting sheaves at these points.

It is important that the tension maintaining sheave 172 and the track sections 176 and 177 should remain in constant relation. Since the sheave 172 must vary from time to time its relation to other structures at station Y and also to portions of the local track there located, it is necessary that the track sections 176 and 177 should participate in any tensioning movement of the sheave 172 and its supporting members. It is for this reason that the free ends of the track continuations 177 are introduced for a distance into the parallel members 156 so that the track members 177 may move longitudinally with relation to the track members 156 without interfering with the supporting continuity of the local track but at the same time permitting the tensioning adjustment of the sheave 172 with its maintained relation to the track members 176 and 177.

The incline 193 will ordinarily cause the closing and locking of the gates 102 and 103, but the end 194 normally rises slightly from the horizontal toward its free end so that any want of exactness of adjustment of the gate operating parts of the bucket is compensated for, the other or normally lower end of the incline 193 rising, if necessary, as the roller 200 passes over the extension 194 and again dropping to normal position after the roller escapes from said extension.

It has already been stated that when a bucket travels up on the track section 61 at station X and reaches the horizontal portion 63 thereof, assuming the section 61 to be elevated, the bucket comes to rest beneath the spout 6. This is brought about by terminating the horizontal portion 100 of the extension 99 of the guide 97 with a drop portion 201, see Figs. 1 and 2, which is in the path of the stud 118 on the bucket when the said bucket is on the portion 63 of the track 61 and the latter is elevated. This will cause the arrest of the bucket should its momentum on reaching the level portion 63 of the track 61 when the latter is elevated be sufficient to carry the bucket beyond proper relation to the mouth of the spout 6.

Considering the buckets only, station X is the loading station and station Y is the dumping or unloading station, but if the terminal station Y is so constructed as to permit the contents of the buckets to reach cars or vessels or other containers, then so far as such cars or vessels or the like are concerned, station Y is a loading station. Since, however, in the structure shown in the drawings, material is loaded into the buckets at station X, this station may be termed the loading station or terminal, and since the contents of the buckets are discharged at station Y, this last-named station may be termed the unloading station or terminal without limiting the use of the terms to the particular ends mentioned.

Under some circumstances it may be convenient or necessary to establish the prime mover for the power cable at station Y and to otherwise modify the structures and arrangement of parts, therefore the invention is not limited to the particular showing of the drawings or to the exact arrangements described.

What is claimed is:—

1. In apparatus of the class described, a station having a cable track connected thereto, a power cable above and adjacent to the cable track, a support for the power cable adjacent to the point of connection of the cable track with the station, and a rigid track local to the station and forming a continuation of the cable track, said local track being in the main on a lower level than the point of coincidence with the cable track and approaching said point through an inclined local track section.

2. In apparatus of the class described, separated stations, separate outgoing and return cable tracks connecting the stations, local tracks at each station forming continuations of the cable tracks, an endless power cable having runs adjacent to the cable tracks, buckets or containers capable of traveling on the tracks and of being coupled to the power cable, means at one station for uncoupling a bucket from the power cable as the bucket enters the station, means under the control of an operator for causing the stopping of the bucket and the loading of the same and for again starting the bucket on its journey, means at the outgoing end of the same station for recoupling the bucket to the power cable, means at the distant station for causing the dumping of the bucket and means also at the distant station for restoring the bucket to a condition to again hold material.

3. In apparatus of the class described, separated stations, separate outgoing and return cable tracks connecting the stations, local tracks at each station forming continuations of the cable tracks, an endless power cable having runs adjacent to the cable tracks, buckets or containers capable of traveling on the tracks and of being coupled to the power cable, means at one of the stations for uncoupling the buckets from the power cable, means for again coupling the buckets to the power cable and located at the same station as the means for uncoupling the buckets from the power cable, and a driving means for the buckets local to the said station.

4. In apparatus of the class described, separated stations, tracks connecting said stations, a power cable adjacent to the tracks, buckets adapted to travel on the tracks and to be coupled to and uncoupled from the power cable, means at one station for uncoupling the buckets on entering the station and coupling them to the power cable on leaving the station and a local drive for the buckets between the points of uncoupling from and coupling to the power cable, said local drive having a slower rate of speed than the power cable.

5. In apparatus of the class described, separated stations, connecting tracks between the stations, a power cable extending between the stations, buckets or containers adapted to the tracks and adapted to be coupled to and uncoupled from the power cable, means at one station for uncoupling the buckets from the power cable and for subsequently coupling the buckets to the power cable, a driving means for the buckets at the same station and actuating the said buckets when uncoupled from the power cable, and means under the control of an operator for disconnecting the buckets from the local drive and re-connecting them thereto at will.

6. In apparatus of the class described, loading and unloading stations and connecting tracks between the same, buckets or containers capable of traveling on the tracks, a power cable for driving the buckets and extending between the stations, and mechanically operated means at one station independent of the main driving means for the buckets for propelling the buckets when traversing the said station.

7. In apparatus of the class described, a loading station provided with a track local thereto, buckets adapted to said track, a local drive for the buckets when on the local track, and a track section included in the local track and under the control of an operator, said track section being movable at will to carry a bucket out of the path of the local driving means.

8. In an apparatus of the class described, separated stations, one constituting a loading station and the other a dumping station, cable tracks connecting the stations, a power cable adjacent to the cable tracks and extending between the stations, buckets or containers adapted to travel on the tracks between the stations and also to traverse the stations, a grip on each bucket for engaging the power cable, means at the entrance side of the loading station for opening the grip, means at the outgoing side of the loading station for closing the gripper onto the power cable, a continuously moving driving means for the buckets local to the loading station and means active to the bucket and controllable at will for moving the buckets to disconnect them from the local drive.

9. In apparatus including buckets or containers and means for moving said buckets or containers from point to point, a loading station for the buckets having means at the side entered by the buckets for disconnecting the buckets from the main driving means, a drive local to the said station and having means for engaging the buckets after being disconnected from the main drive, said local drive traveling at a slower rate of speed than the main drive, a track at the loading station local to said station and sustaining the buckets while engaged by the local drive, a pivoted section included in said local track and adapted to have one end raised above the level of the track to thereby cause the elevation of the buckets traveling thereon out of engagement with the local drive, and means at the loading station beyond the pivoted section of track in the line of travel of the buckets for causing the recoupling of the buckets to the main drive.

10. In apparatus of the class described, a loading station, a track thereat, buckets or containers adapted to travel on said track, a driving means for said buckets local to said station and adapted to automatically engage said buckets when on the local track, a track section included in the local track and means under the control of an operator for elevating the track section above the level of the track to cause a corresponding elevation of the bucket to lift it clear of the local driving means.

11. In apparatus of the class described, a loading station provided with a local track having a section capable of being elevated above the general level of the track, said local track being adapted to receive and sustain a suitable bucket or container, a local drive at the loading station adapted to engage a bucket or container traveling on the local track, and a guide member adjacent to the local drive and having a deflected portion coinciding with the track section capable of elevation.

12. In apparatus of the class described, a terminal station, cable tracks leading to and from the same end of the station, a local track at said station forming a loop connecting the ends of the cable tracks, anchorages for the ends of the cable tracks at the stations closer together than the cable tracks exterior to the station, and guiding saddles for the cable holding the cable from lateral displacement at the anchorage ends thereof.

13. In apparatus of the class described, a terminal station, cable tracks leading to and from the same end of the station, a local track at said station forming a loop connecting the ends of the cable tracks, anchorages for the ends of the cable tracks at the station closer together than the cable tracks exterior to the station, and saddles supporting the cables at the station and shaped to divert the cables from the line of entrance at the station to the anchorages and forming means to prevent lateral movement of the cables from each other.

14. In apparatus of the class described, a traveling bucket or container provided with a gripping mechanism, a power cable for propelling the bucket, and a loading station for the bucket entered by the power cable, said loading station being provided at the bucket entering end with a grip actuating means for uncoupling the bucket from the power cable, a grip actuating means at the exit end of the station for recoupling the bucket to the power cable, and a grip actuating means adjacent to the grip actuating means at the exit end of the station for insuring the opening of the grip as it approaches the grip closing means.

15. In apparatus of the class described, a power cable, a bucket adapted to be coupled to and uncoupled from said power cable, a grip carried by the bucket and adapted to connect the said bucket to the power cable, said grip being provided with cable gripping jaws at one end and a jaw actuating lever extending toward the other end of the grip, the said grip being carried by the bucket transversely to the length of the power cable, and means for closing the grip onto the power cable comprising rotatable disks adapted to simultaneously engage the grip at the jaw end and at the lever end respectively.

16. In an apparatus of the class described separated loading and unloading stations, tracks connecting said stations, an endless power cable extending between and into the stations, buckets or containers adapted to be connected to and remain connected to the power cable from the loading station into the unloading station, means for uncoupling the buckets from the power cable and maintaining them uncoupled while traversing the loading station, and a local propelling means at the loading station for said buckets.

17. In an apparatus of the class described, separated loading and unloading stations, tracks connecting said stations, a power cable extending between and passing into the stations, buckets or containers adapted to be connected to and remain connected to the power cable from the loading station into the unloading station, means for uncoupling the buckets from the power cable and maintaining them uncoupled while traversing the loading station, and a local propelling means at the loading station for said buckets, said local propelling means traveling at a slower speed than the speed of the power cable.

18. In apparatus of the class described, a terminal station provided with supporting framework for structures at said station, said supporting framework having laterally extended overhanging portions, cable tracks connected at one end of said framework to overhanging members thereof, a track local to the station and forming a connecting loop for the cable tracks, said local track being also carried by overhanging portions of the framework, a power cable above and in operative relation to the cable tracks, and entering the terminal station, pendent buckets having supporting means adapted to travel on the cable tracks and on the local tracks, a grip on the supports for the buckets adapted to engage the power cable, means at the terminal station for operating the grip to disengage the buckets from the power cable as they enter the station and to reëngage the buckets with the power cable as they leave the station, means included in the local tracks for engaging the bucket carriage, and a local propelling means for the buckets at the terminal station, into the path of which propelling means the buckets move when uncoupled from the power cable and out of the path of which local propelling means the buckets are moved by the said local track included means.

19. In apparatus of the class described, a loading station, a dumping station separated therefrom, cable tracks connecting the stations, a power cable extending between the stations in operative relation to the cable tracks, a local track at the dumping station comprising a portion in fixed relation to the cable tracks and another portion movable longitudinally with reference to the fixed portion, a movable frame having a constant tendency in one direction and carrying the movable track, and a sheave carried by said frame and around which sheave the power cable travels.

20. In apparatus of the class described, a loading station, a dumping or unloading station, cable tracks connecting the stations, a power cable extending between the stations in operative relation to the cable tracks, pendent buckets or containers adapted to travel on the cable tracks and to be propelled by the power cable, said buckets having dumping gates, a local track at the dumping station forming a connecting loop for the ends of the cable tracks at said station, means on one side of the dumping station for causing the unlatching of the gates of the buckets, and means on the other side of said station for causing the closing of the gates of the buckets before leaving said station.

21. In an apparatus of the class described, separated terminal stations, an endless power cable extending between the stations, tracks also extending between the stations, a power cable driving means at one station, a power cable tension means at the other station, a local track at the last named station having a section movable with the tension means, buckets or containers adapted to be coupled with the power cable and movable along the tracks between the stations and also along the local track at the tension station, means at the last named station on the entrance side thereof for causing the dumping of the buckets, and means on the exit side of the same station for causing the return of the buckets to normal condition.

22. In an apparatus of the class described, separated loading and unloading stations, suspended tracks connecting said stations, a power cable extending between and passing through the stations, buckets or containers adapted to be connected to and remain connected to the power cable from the loading station to and through the unloading station and back to the loading station, means for uncoupling the buckets from the power cable and maintaining them uncoupled while traversing the loading station, and a local propelling means at the loading station for said buckets, said local propelling means traveling at a slower speed than the speed of the power cable.

23. In an apparatus of the class described, a power cable, an actuating means for the cable, buckets or containers adapted to be propelled by the power cable, and an independently operated driving means for the buckets bridging the interval in the line of travel of the buckets where the power cable goes to the actuating means therefor.

In testimony that I claim the foregoing as my own, I have hereto affixed my signature in the presence of two witnesses.

SEBERN A. COONEY.

Witnesses:
C. E. DOYLE,
F. T. CHAPMAN.

---

Copies of this patent may be obtained for five cents each, by addressing the "Commissioner of Patents, Washington, D. C."